Oct. 18, 1966    P. A. MISANCHUK    3,279,010
CORD-LENGTH VARYING DEVICE
Filed June 28, 1965
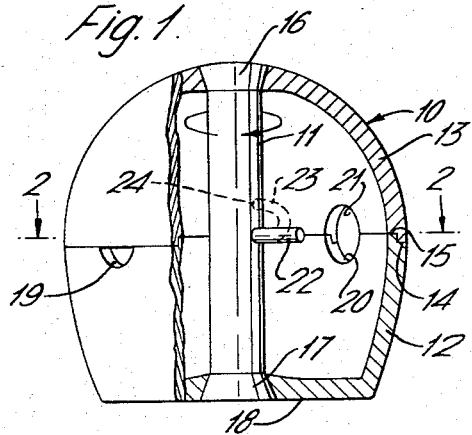
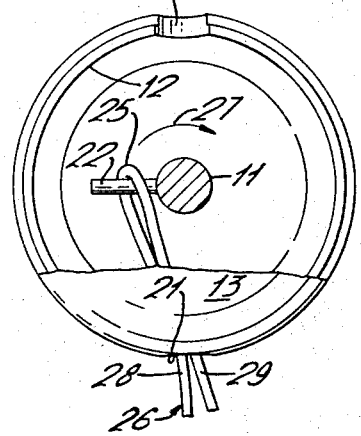 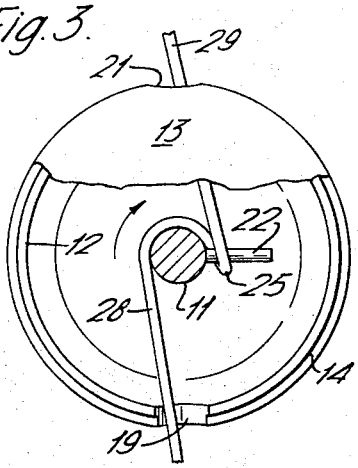
INVENTOR
Peter A. Misanchuk
BY
ATTORNEY United States Patent Office 3,279,010
Patented Oct. 18, 1966

3,279,010
CORD-LENGTH VARYING DEVICE
Peter A. Misanchuk, R.R. 3, Box 32, Bowmanville,
Ontario, Canada
Filed June 28, 1965, Ser. No. 467,552
5 Claims. (Cl. 24—71.2)

The present invention relates to devices for varying the effective length of a cord such as an electric cord, between the ends thereof by seizing the cord between said ends, an object and advantage of the invention being to provide conspicuously simple and inexpensive means by the use of which an unsightly, or obstructive, dangerously or otherwise, length of cord may be wound neatly within a small device capable of being agreeably designed, the use of which does not entail any necessity for temporarily disconnecting one end of said cord from what it is attached to for the purpose of threading said cord through said device, but which, by contrast, permits the cord to be wound thereon starting from any point upon its length, according to how much of the cord it is desired to wind into the containing device.

A further object and purpose of the present invention is to provide device of the character herewithin described in which the parts do not have to be separated, with liability to becoming lost or broken as a result of such separation, in the operation of winding a cord thereinto and effectively shortening its length.

A further object and purpose of the present invention is to provide a device of the character herewithin described which is conspicuously easy to operate, positive in action and which does not require skilled manipulation or tiresome repetition in order to function in its intended manner.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 1 is a cross-sectional and partly fragmented elevation of the present invention in one exemplification of the inventive concept embodying same.

FIGURE 2 is a section on the plane 2—2 of FIGURE 1, but illustrating the relative positions of the cord-winding recess and finger in preferable starting relationship.

FIGURE 3 is a view similar to FIGURE 2 but depicting the upper portion of the body as having been rotated 180° clockwise with respect to FIGURE 2 so as to show a loop of cord effectively seized about the finger prior to the commencement of effectively shortening the cord.

In the drawings, like characters of reference designate similar parts in the several figures.

Cord, particularly, but not necessarily, electric cords which are longer than they need be as for example between their connection to the mains and the appliance can be very unsightly, and, in addition, dangerous. They also collect dust and dirt and are generally undesirable. The present device is for the purpose of taking up the slack in a cord between the end which is connected to the mains and the end which connected to the appliance. Although the same as depicted in the accompanying drawings is of a substantially globular form, it is to be understood that the same may be relatively shallow and discoid for instance, and is susceptible to being made to look very attractive, and, if desired unobtrusively so. In virtue of the fact that the two main parts are permanently connected together moreover, it can be manufactured when desired, very inexpensively for wide distribution.

The embodiment of the basic inventive concept particularly exemplified in the accompanying drawings therefor, comprises a hollow, cord-containing body collectively designated 10 having a cord-winding post generally designated 11 extending therethrough. The said body is formed of a base portion generally designated 12, and a relatively rotatable upper or winding portion generally designated 13.

The portions 12 and 13 have perimeters 14 and 15 which are co-terminous and may be rabbetted as depicted if desired. The post 11 is secured at its upper end 16 for rotation with portion 13. The lower end of the post is mounted in a form of simplified end or thrust bearing 17 formed in the floor 18 and centrally, of portion 12.

From the foregoing it will be apparent that the portions 11 and 13 rotate as a unit. Formed at diametrically opposite points upon the perimeter 14 of portion 12 are cord-retaining and cord-passing recesses 19 and 20. Upon the perimeter of the winding portion 13 is a single cord-winding recess 21 registrable with recesses 19 and 20.

Projecting preferably at right angles from post 11 and preferably approximately in the rotary plane of the recess 21 is a finger 22. This finger may quite satisfactorily simply consist of an outwardly projecting straight element, but, if desired, may be upwardly and reversely hooked as illustrated in phantom lines at 23 of the accompanying FIGURE 1. If so hooked, it should be understood that the inner end 24 is spaced from the post 11 to permit entry over the hook of the cord-loop 25.

Particularly if a straight finger 22 be employed, the same should preferably extend at right angles to the location of recess 21 as clearly indicated by reference both to the accompanying FIGURES 2 and 3. The invention having been described structurally, its mode of use will next be explained.

According to the amount of cord it is desired to wind into the aforesaid device, such cord 26 will be looped as already indicated at 25 and the loop inserted between the coinciding recesses 19 and 21 and passed around the finger 22 as indicated in the accompanying FIGURE 2. The portion 13 together with post 11 and of course the finger 22 are now rotated clockwise as indicated by arrow 27 with one run 28 of the cord held in the recess 20 while the other run 29 is caused to rotate within the upper recess 21. If portion 13 be rotated through 180° carrying the run 29 with it, it follows that the loop 25 will be made fast or seized around the finger 22 as depicted in the accompanying FIGURE 3.

Run 29 may now be lowered so as to be free of the recess 21, and admitted into the recess 20 while the two are in coincidence. Now, if rotation of portion 13 be continued, together of course with post 11 and finger 22, the cord 26 will be wound upon the post progressively until the effective slack has been taken up. If it be desired to shorten a cord to the maximum extent possible, then the loop 25 will be formed at the mid-point of the cord between the ends thereof. If however only a small portion is to be taken up, then the loop may be formed further toward one end or other of the cord according to circumstances.

Since various modifications can be made to the invention herein described within the scope of the inventive concept disclosed, it is not intended that protection of the said invention should be interpreted as restricted to the modification or modifications or known parts of such concept as particularly described, defined or exemplified, since this disclosure is intended to explain the construction and operation of such concept and is not for the purpose of limiting protection to any specific embodiment or details thereof.

What I claim as my invention is:

1. A device for varying the effective length of a cord between the ends of said cord, by seizing said cord between said ends, comprising a hollow cord-containing body and a cord-winding post extending therethrough, said body being formed of a base portion and a relatively rotatable winding portion, said two portions having perimeters which are co-terminous, said post being secured at one end thereof for rotation with said winding portion, a thrust-bearing in said base portion to receive the opposite end of said post, the perimeter of said base portion being provided with a pair of diametrically opposite cord-retaining and cord-passing recesses, the perimeter of said winding portion having a cord-winding recess registrable with said cord-retaining and cord-passing recesses, and a cord-loop catching finger projecting from said post.

2. The device according to claim 1 in which said finger is hooked.

3. The device according to claim 1 in which said finger is in angular relationship to said cord-winding recess, said finger and said recess being in substantially a co-incident rotary plane.

4. The device according to claim 3 in which said angular relationship is one in which said finger is approximately 90° in advance of said recess considered in the direction of their common rotation.

5. The device according to claim 1 in which said finger is hooked, and in which said finger is in angular relationship to said cord-winding recess, said finger and said recess being in substantially a co-incident rotary plane.

References Cited by the Examiner

UNITED STATES PATENTS

| | | | |
|---|---|---|---|
| 1,609,309 | 12/1926 | Renz | 242—100.1 |
| 1,659,602 | 2/1928 | Jensen | 24—71.2 |
| 2,045,966 | 6/1936 | Ruehmann | 242—86.1 |
| 2,678,779 | 5/1954 | Bellmer | 242—107.1 |
| 3,208,121 | 9/1965 | Price | 24—71.2 |

FOREIGN PATENTS 306,659  2/1929  Great Britain.

WILLIAM FELDMAN, *Primary Examiner*.

M. S. MEHR, *Assistant Examiner*.